Figure 1:
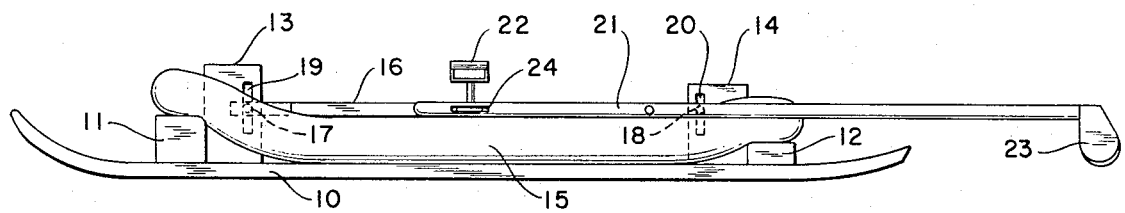

United States Patent [19]

Mitchell

[11] 3,773,345
[45] Nov. 20, 1973

[54] SNOW VEHICLE
[76] Inventor: Byron V. Mitchell, 17754 Meekland Ave. Hayward, Calif. 94541
[22] Filed: Mar. 6, 1972
[21] Appl. No.: 231,903

[52] U.S. Cl............................................. 280/21 R
[51] Int. Cl.............................................. B62b 13/08
[58] Field of Search.................. 280/12 R, 21 R, 18; 9/310 B, 310 F

[56] References Cited
UNITED STATES PATENTS
| 3,632,124 | 1/1972 | Cropp | 280/12 R |
| 2,245,401 | 6/1941 | Hooker | 9/310 B |
| 3,479,046 | 11/1969 | Thompson | 280/18 |

FOREIGN PATENTS OR APPLICATIONS
| 43,204 | 2/1910 | Austria | 280/21 R |

Primary Examiner—Robert R. Song
Attorney—Glen R. Grunewald

[57] ABSTRACT

A snow vehicle is disclosed including a single ski on which is mounted stabilizing symmetrical pontoons which are positioned, in use, to extend downward to a higher elevation than the lowest surface of the ski to preserve the ability of the vehicle to maintain directional stability, and a passenger or cargo platform mounted on the pontoons. The vehicle fitted with rearwardly extending steering and braking means is also disclosed.

5 Claims, 3 Drawing Figures

PATENTED NOV 20 1973　　　　　　　　　　　　　　　3,773,345

SNOW VEHICLE

BACKGROUND

Moving persons or cargo over snow for utility or recreation is a problem that has been dealt with through a number of approaches. The use of a sled having thin runners provides a suitable vehicle on packed snow, and when there are separate front and rear runners with the front runners mounted on a pivot, such sleds may even be steered. Sleds with narrow runners cannot be used successfully in soft snow because the runners penetrate the snow.

For soft deep snow, devices that provide a large area in contact with the snow per unit of weight are required. Such devices as tobaggans, skis or, more recently, saucer sleds are usually employed as vehicles in soft deep snow. Except for skis on a skilled skier, such devices are very difficult to steer or stop, are very uncomfortable used over rough surfaces and, in the case of saucer sled, they do not have directional stability; i.e., there is no way to keep the front facing forward when coasting downhill, that is, when not being towed.

THE INVENTION

This invention relates to a vehicle for use in soft snow that provides a novel approach to snow vehicles and overcomes most of the disadvantages of such prior snow vehicles. The snow vehicle of this invention is a pontoon sled, comprised of a single ski and stabilizing pontoons. Positioned for use with the lower surface of the ski in contact with snow, the pontoons do not extend downward as far as the ski does whereby the vertical side surfaces of the ski are in contact with snow and the directional stability of the vehicle is assured. A platform is mounted on the pontoons or directly on the ski to carry passengers or cargo.

The single ski used in this device should be long enough and wide enough to support the vehicle and its intended cargo on the snow. It is contemplated that the ski will be of conventional design, with a pointed and turned-up front and suitably finished on the bottom to provide minimum friction with a snow surface. The ski may be made of two or more sections that may be connected, for example, with a hinge to provide for easy packing in an automobile.

The pontoons employed on the snow vehicle must be large surface forms with rounded surfaces in contact with the snow. Although they may be rigid, for example elongated aluminum hull-like shapes, the pontoons preferably are inflatable rubber or rubber-like elements. Particularly preferred are pontoons formed from a single large tube such as the inner tube of a large truck tire which is stretched to be elongated from the front to the rear of the ski. Also, preferably the single inner tube pontoons are mounted on the ski so that the leading points of the pontoons are turned up much as the leading portion of a ski.

When the pontoons are flexible inflated rubber elements, they will naturally ride higher on soft snow than the rigid ski, and the ski will penetrate the snow to provide the desired directional stability. When rigid pontoons are employed, the elevation of their lower surfaces vis-a-vis the lower surface of the ski will have to be more carefully regulated. Another advantage to inflatable pontoons is that they are easier to transport with ordinary vehicles, such as automobiles, in that they may be deflated and stored compactly during transportation. Still another advantage of inflatable pontoons is that a passenger platform mounted on the pontoons will provide a cushioned ride.

Particularly when flexible pontoons are used, the vehicle may be steered by leaning to one side or the other. However, when it is necessary to turn sharply, steering devices that engage the snow at the rear portion of the vehicle, or even behind it, may be used. Such a steering device mounted on either side of the vehicle may turn the vehicle be engaging the snow on the side corresponding to the direction it is desired to turn. Of course, if both steering devices engage the snow at the same time they act as brakes and the vehicle may slow or stop without turning in either direction. In a preferred embodiment the operating handles of the steering-braking devices can be locked to the platform in inoperative position and may, in locked position, by employed simply as handles for a passenger for use to maintain his position on the platform.

Figure 2:
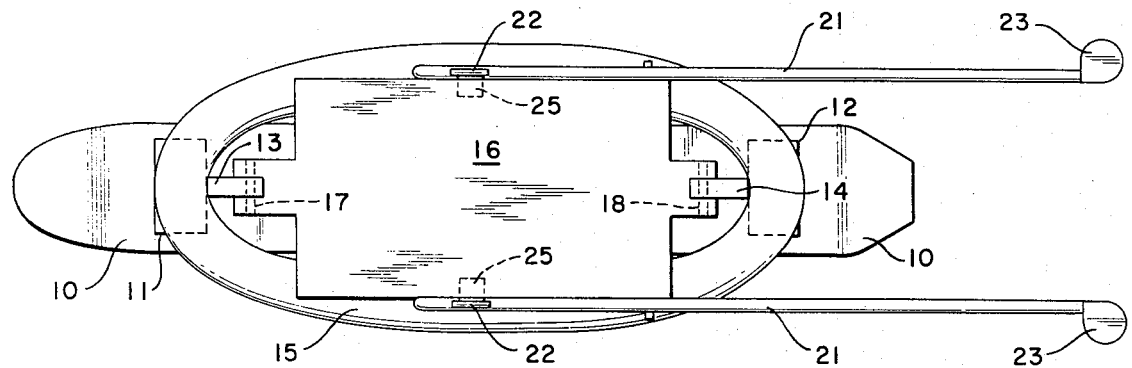
Figure 3:
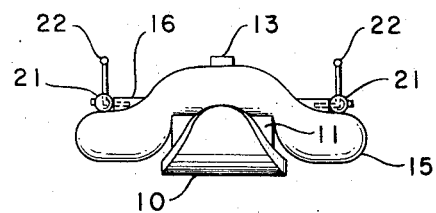

The invention can be best described with reference to the accompanying drawings. FIG. 1 is a side elevation view of a vehicle embodying this invention. FIG. 2 is a plan view of the vehicle of FIG. 1. FIG. 3 is a front elevation view of this embodiment of FIG. 1. In all views corresponding parts are shown by the same reference number.

Referring to the drawings, a single ski 10 is the support for the entire vehicle. Ski 10 has a forward block 11 fixed to its upper surface and a rear block 12 similarly fixed to its upper surface. A function of blocks 11 and 12 is to provide elevation for the front and rear extremes of the pontoons to provide them with a turned-up leading edge regardless of the direction of vehicle travel. Another function of blocks 11 and 12 is to provide structural members to fasten front tube-holding element 13 and rear tube-holding element 14 rigidly. Tube-holding elements 13 and 14 stretch pontoons 15 between forward and rearward positions. In particular when the pontoons 15 are formed by distorting a torus-shaped member, such as a large truck tire inner tube to be elongated from front to rear, structural elements 13 and 14 working in conjunction with blocks 11 and 12 cause the pontoons to be shaped to function effectively as pontoons.

Platform 16 is shown mounted on pontoons 15 but fixed between structural elements 13 and 14. When platform 16 is mounted on flexible, inflated pontoons the ride will be more cushioned, but when it is contemplated to traverse rugged terrain, the platform 16 may be fixed rigidly to ski 10.

In a particularly desirable embodiment, the platform 16 may be connected directly to ski 10 while still maintaining a cushioned ride if the platform 16 is fixed to an element connected firmly to ski through a vertical slot. As illustrated, the platform 16 terminates in a forked element 17 at the front and a similar element 18 at the rear, which elements are provided with a hole to receive metal members, not shown, that ride in slots 19 and 20 respectively in elements 13 and 14. Thus, a passenger riding on the platform 16 will have bumps cushioned by the compression of pontoon 15 while still being firmly fixed to ski 10.

In the embodiment shown a long operating rod 21 is pivoted to the rear portion on each side of platform 16. An operating handle 22 is shown at the forward portion of each rod 21. Space elements 23 are shown at the rear of rods 21, and these spades are preferably positioned so as to lie in a plane that is not perpendicular to the axis of ski 10. The spades so affixed act as plows and slow, stop or steer the vehicle without building up large volumes of snow in front of them when they are in use.

The operating handles 22 are fixed on pivots and turning them 90° will cause tongues 24 to engage a slot 25 in platform 16 whereby the operating rod 21 is locked in inoperative position, that is, a position where spade elements 23 are out of engagement with the snow. In locked position handles 22 form a firm grip for a passenger to hold himself on platform 16. When it is desired to steer or brake the vehicle, one or both of operating handles 22 may be turned 90° whereby operating rods 21 are free to be moved vertically to cause spades 23 to engage the snow. It is preferred that operating rods 21 be pivoted at the rear of platform 16 to provide maximum leverage for braking and steering.

The drawings and the foregoing description of them obviously represent one useful embodiment of the invention and are intended to be illustrative rather than limiting on its scope.

What is claimed is:

1. A snow vehicle comprising in combination:
   a. a single ski,
   b. symmetrical pontoon elements mounted on said ski with the lowest surface of said pontoon elements at an elevation above the lowest surface of said ski when in normal use and said pontoon elements extending laterally from the axis of said ski beyond the side edge of said ski, and
   c. a passenger or cargo platform mounted on said pontoon elements.

2. The vehicle of claim 1 wherein said pontoon elements are flexible and inflatable.

3. The vehicle of claim 1 wherein said pontoon elements comprise a single inflatable tube stretched between forward and rear structural elements fixed to said ski.

4. The vehicle of claim 1 wherein manually operated rearwardly extending snow-engaging elements pivoted to said platform are provided for steering and braking said vehicle.

5. The vehicle of claim 4 wherein said snow-engaging elements are provided with means to be locked in inoperative position whereby handles for passenger stability are provided.

* * * * *